US008223236B2

(12) United States Patent  (10) Patent No.: US 8,223,236 B2
Ostlund  (45) Date of Patent: Jul. 17, 2012

(54) APPARATUS AND METHOD FOR IMAGE RECORDING

(75) Inventor: Petter Ostlund, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 633 days.

(21) Appl. No.: 12/217,361

(22) Filed: Jul. 3, 2008

(65) Prior Publication Data

US 2010/0002116 A1  Jan. 7, 2010

(51) Int. Cl.
H04N 3/14 (2006.01)
H04N 5/335 (2011.01)
H04N 5/217 (2011.01)
G06K 9/40 (2006.01)

(52) U.S. Cl. .......... 348/302; 348/241; 382/275

(58) Field of Classification Search ............ 348/208.99, 348/208.4, 302–305, 451–452, 700–701; 382/275

See application file for complete search history.

(56) References Cited

U.S. PATENT DOCUMENTS

| 4,280,141 A | 7/1981 | McCann et al. | |
| 6,642,960 B1* | 11/2003 | Kohashi et al. | 348/246 |
| 6,707,498 B1 | 3/2004 | Toma et al. | |
| 7,414,671 B1* | 8/2008 | Gallagher et al. | 348/625 |
| 7,538,824 B1* | 5/2009 | Pillay et al. | 348/701 |
| 2003/0007083 A1 | 1/2003 | Rossi et al. | |
| 2009/0040349 A1* | 2/2009 | Xu | 348/302 |

FOREIGN PATENT DOCUMENTS

| EP | 0 455 444 A1 | 11/1991 |
| EP | 0 589 643 A1 | 3/1994 |
| EP | 1 781 015 | 5/2007 |

OTHER PUBLICATIONS

International Search Report for International Application No. PCT/EP2008/011068 mailed Mar. 20, 2009.
International Preliminary Report on Patentability for International Application No. PCT/EP2008/011068 dated Sep. 22, 2010.

* cited by examiner

Primary Examiner — Kelly L Jerabek
(74) Attorney, Agent, or Firm — Edwards Wildman Palmer LLP; Peter F. Corless; Steven M. Jensen

(57) ABSTRACT

Apparatuses and methods which involve reading out an image sensor comprising an array of light-sensitive sensor elements are disclosed. In an embodiment, the light-sensitive sensor elements are grouped into a plurality of consecutive sensor element groups, and in an embodiment reading out the light-sensitive sensor elements is performed groupwise in an at least partially not according to the consecutive order of the groups.

19 Claims, 3 Drawing Sheets

APPARATUS AND METHOD FOR IMAGE RECORDING

FIELD OF THE INVENTION

This invention relates to apparatuses and methods for image recording.

BACKGROUND OF THE INVENTION

Current apparatuses for image recording like still cameras, video cameras, cameras incorporated into mobile devices like laptops, cellular phones or apparatuses for scientific image recording use electronic sensors to record an image. Commonly used electronic sensors for image recording or capturing are CCD (Charge Coupled Device) sensors and CMOS (Complementary Metal Oxide Semiconductor) sensors. Such sensors typically include a plurality of sensor elements, sometimes referred to as pixels ("picture elements"), which are arranged in a geometrical pattern. A commonly used sensor element arrangement for example in digital cameras is a rectangular array, although other arrangements, for example circular arrays, are equally used. The number of such sensor elements each of which records at least the brightness of a corresponding picture part determines the resolution of the recorded image. For recording color information, sensors exists where a single sensor element is able to distinguish between colors, while in other types of image sensors color filters for the primary colors red, green and blue are arranged in front of the sensor, for example in a so-called Bayer-pattern, such that each sensor element records a specific color and the overall color may be determined from adjacent picture elements recording different colors.

At least with some of these sensors, the sensor elements are not read out simultaneously, but group-wise in a staggered manner. For example, CMOS-type sensors are frequently read out row be row (or column by column) in a case where the sensor elements are arranged in a matrix-like array. For example, assuming that the rows are numbered consecutively from a top side to a bottom side of the sensor, the start of readout of the second row may be delayed compared with the start of the readout of the first row, the start of readout of the third row is delayed compared to the start of readout of the second row, etc.

While for recording images of non-moving objects this generally does not constitute a problem, when recording images of moving objects an effect sometimes referred to as "rolling shutter" may occur. In particular, when groups of sensor elements like rows of a CMOS sensor are not read out simultaneously, but delayed compared with each other, the position a moving object is recorded at in a first group of sensor elements may sometimes not coincide with the position the object is recorded at in a second group of sensor elements. In this manner, for example a straight vertical line moving to the left or to the right may be recorded as a line tilted to the right or to the left, respectively.

A conventional approach to at least mitigate this problem is the use of a shutter which exposes the complete image sensor to illumination only for a short predetermined period of time, the period of time itself being for example dependent on the overall illumination of a scene to be recorded. However, such shutters constitute an additional mechanical part needed for image recording which, on the one hand, adds to the manufacturing costs and, on the other hand, in applications where only little space is available, for example when a digital camera function is integrated in another mobile electronic device like a cellular phone, it is desirable not to use a shutter for space, weight, and/or design reasons.

Therefore, there is continuing need to address the problem of rolling shutter.

SUMMARY OF THE INVENTION

According to an embodiment, an apparatus is provided, comprising:
an image sensor, said image sensor comprising an array of light-sensitive sensor elements, wherein the light-sensitive sensor elements are grouped into a plurality of consecutive groups, and
a read-out circuit configured to read out the light-sensitive picture elements groupwise, wherein the read-out circuit is further configured to perform the groupwise reading out of the groups in a read-out order at least partially deviating from the consecutive order of the groups.

The read-out circuit may be configured to read out the light-sensitive sensor elements such that between the start of readout of at least two consecutive groups of said plurality of groups the readout of at least one further group of said plurality of groups is initiated.

In an embodiment, the plurality of groups are further grouped into a plurality of consecutive sets of groups, wherein the read-out circuit is configured to read out the sets of groups according to their consecutive order and configured to read out the groups within each set at least partially deviating from their consecutive order.

Said light-sensitive sensor elements may be arranged in matrix form, said matrix comprising a plurality of rows and a plurality of columns,
wherein each of said groups is formed by one element selected from a row, a column, at least two consecutive rows and at least two consecutive columns.

In an embodiment, said read-out circuit is at least partially integrated in said image sensor.

In an embodiment, said image sensor is selected from the group comprising a CMOS sensor and a CCD sensor.

The apparatus in an embodiment may further comprise: an image processor coupled to said read-out circuit to receive signals from said read-out circuit describing an image recorded by said image sensor,
wherein said image processor is configured to detect patterns caused by said read-out order and indicative of a moving object.

Said pattern detection may comprise an edge detection.

In an embodiment, said image processor is further configured to correct the effects in said image caused by said moving of said object.

In an embodiment, said correction is performed depending on at least one parameter selected from the group chosen from said read-out order of said groups, a read-out time of said groups, a deviation of image elements from an edge detected in said image and a time delay between readout of two of said groups.

Said apparatus may be an apparatus selected from the group comprising a cellular phone, a digital camera, a laptop and a personal digital assistant.

In another embodiment, a method of reading out image data from an image sensor is provided,
said image sensor comprising an array of light-sensitive sensor elements, wherein the light-sensitive sensor elements are grouped into a plurality of consecutive sensor element groups, said method comprising:

reading out said light-sensitive sensor elements groupwise, wherein the groupwise reading out is performed according to a read-out order at least partially deviating from the consecutive order of said groups.

In an embodiment, the reading out is performed such that between the start of readout of at least two consecutive groups of said plurality of groups the readout of at least one further group of said plurality of groups is initiated.

In an embodiment, the plurality of groups are further grouped into a plurality of consecutive sets of groups, wherein the reading out is configured to read out the sets of groups according to their consecutive order and configured to read out the groups within each set at least partially deviating from their consecutive order.

Said light-sensitive sensor elements may be arranged in matrix form, said matrix comprising a plurality of rows and a plurality of columns, wherein each of said groups is formed by one element selected from a row, a column, at least two consecutive rows and at least two consecutive columns.

The method may further comprise:
detecting patterns in image data read out from said image sensor, said patterns being caused by said read-out order and being indicative of a moving object being recorded in said image.

The above defined features of various embodiments of the present invention may be freely combined with each other unless specifically noted to the contrary.

DETAILED DESCRIPTION OF THE INVENTION

Figure 1:
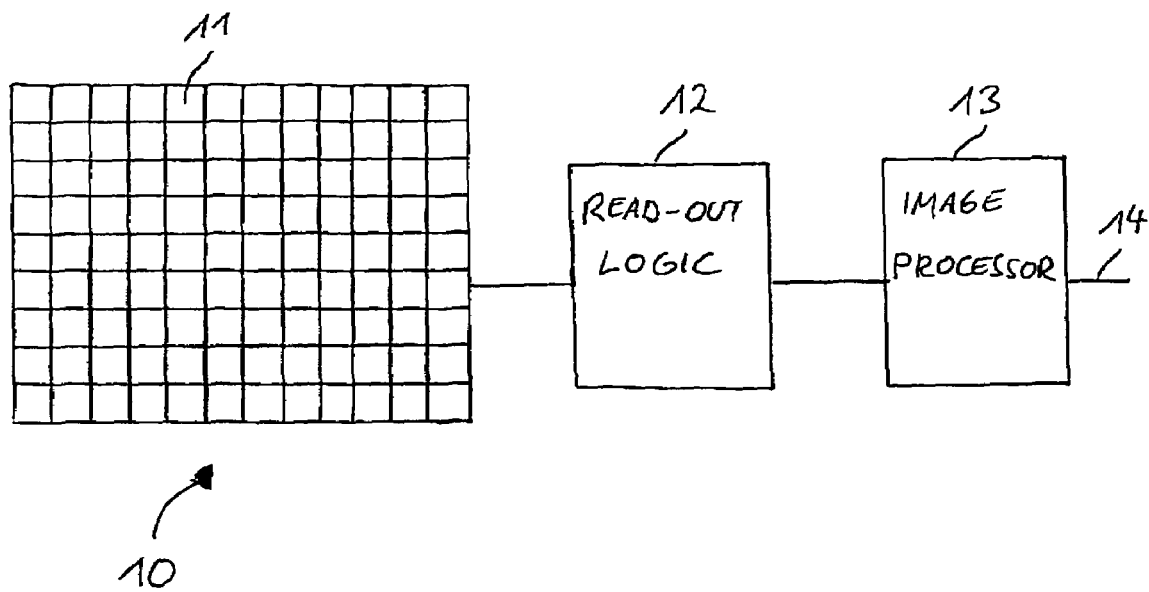
FIG. 1 is a block diagram of an apparatus according to an embodiment of the present invention.

In the following, embodiments of the present invention will be described in detail. It is to be understood that the following description is given only for the purpose of illustration and is not to taken in a limiting sense. The scope of the invention is not intended to be limited by the embodiments described hereinafter, but is intended to be limited only by the appended claims and equivalents thereof.

It is also to be understood that in the following description of embodiments, any direct connection or coupling between functional blocks, devices, components, circuit elements or other physical or functional units shown in the drawings or described herein, i.e. any connection without intervening elements, could also be implemented by an indirect connection or coupling, i.e. a connection or coupling with one or more additional intervening elements. Furthermore, it should be appreciated that the partitioning of embodiments into functional blocks or units shown in the drawings is not to be construed as indicating that these units necessarily are physically separate. Functional blocks or units may be implemented as separate circuits, chips or elements, but one or more functional block or unit may also be implemented in a common circuit or common chip.

It is to be understood that the features of the various embodiments described hereinafter may be combined with each other unless specifically noted otherwise.

Furthermore, it is to be understood that describing an embodiment comprising a plurality of elements is not to be construed as indicating that all these elements are necessary for practicing the present invention. Instead, in other embodiments, only some of such elements and/or alternative elements may be present.

It is to be noted that any directional terminology like "top", "bottom", "left", or "right" used in the following detailed description is merely used for easy reference to certain portions of the drawings and is not to be construed as limiting the actual positioning of elements of embodiments in implementations thereof. For example, such directional terminology may be used to refer to part of image sensors like sensor elements, rows of sensor elements or columns of sensor elements, but in a physical implementation such an image sensor may be orientated in any desired manner, for example depending on how a user holds a camera incorporating the image sensor.

It should be noted that as conventionally used in the art, the term "picture element" or "pixel" is used both for designating a light-sensitive element of a sensor and to the corresponding element or point of the image such a light-sensitive element captures. In order to avoid any confusion, in the following the light-sensitive elements of an image sensor will be designated "sensor elements", and the resulting elements, for example points, of an image will be referred to as "image elements", keeping in mind that as conventionally used the term "picture element" or "pixel" is used to designate both of these types of elements.

Turning now to FIG. 1, an apparatus for recording images according to an embodiment of the present invention is shown. The apparatus of FIG. 1 may be incorporated in any device adapted to record images, for example a still camera, a video Camera, a cellular phone, a laptop computer or other mobile, i.e. portable, electronic device. The apparatus of the embodiment of FIG. 1 comprises an image sensor 10, a read-out logic 12 configured to read out the image sensor 10, i.e. to obtain electric signals indicative of an image recorded by image sensor 10, and a image processor 13 coupled to read-out logic 12, image processor 13 being configured to process the signals read out by read-out logic 12 and output corresponding image data at an output 14.

In the embodiment of FIG. 1, image sensor 10 may for example be a CMOS (Complementary Metaloxide Semiconductor) sensor or a CCD (Charge Coupled Device) sensor.

Image sensor 10 comprises a plurality of sensor elements (pixels) 11. In FIG. 1, to give an example image sensor 10 comprises a plurality of sensor elements arranged in a rectangular array or matrix twelve sensor elements wide and nine sensor elements high or, in other words, in the example of FIG. 1 image sensor 10 comprises nine rows, each row comprising twelve sensor elements 11. It should be noted that this arrangement serves only as an example, and neither the arrangement nor the number of pixel elements is particularly limited. For example, image sensors may comprise some millions of sensor elements, also referred to as megapixels. The sensor elements may be arranged in a rectangular matrix with any desired aspect ratio, i.e. ratio of width to height, for example a ratio of approximately 3:2, approximately 4:3 or approximately 16:9, in a circular array, in an oblong array, in a square-shape array or any other arrangement suitable for a particular application.

In the embodiment of FIG. 1, as already mentioned readout logic 12 serves to read out image sensor 10, i.e. image sensor 10 changes its state depending on light exposure, for example changes a charge state, changes the resistance of a MOS transistor or other photo-sensitive elements, and readout logic 12 detects these changes and converts them into electric signals indicative of the image recorded. It should be noted that in an embodiment read-out logic 12 may be fully or partially integrated with image sensor 10. For example, in conventional CMOS sensors, part of the read-out logic is integrated in the sensor.

In the embodiment of FIG. 1, this readout is performed groupwise. In such an embodiment, the sensor elements 11 of image sensor 10 are grouped into a plurality of adjacent groups of sensor elements, and the groups are at least partially read out in a sequential manner. For example, in an embodiment the above-mentioned groups of sensor elements are formed by the rows of sensor elements, i.e. the first or topmost forms a first group, the second (second topmost) row forms a second group, etc. until the bottommost row (ninth row in the example shown in FIG. 1) forms the last group, in this case the ninth group. "Sequential" in this respect means that the readout of the groups is started one after the other, although the read-out times for the different groups may partially overlap.

It should be noted that in other embodiments, the groups may be formed in a different manner than rowwise. For example, two or more rows may together form a group, and/or single column or two or more adjacent columns may form such a group which is read out jointly. In another embodiment, parts of rows and/or parts of columns may form such groups.

It should be noted that the different groups need not have the same size. For example, in an embodiment one group may comprise a single row of sensor elements, while another group may comprise two adjacent rows of sensor elements.

In an embodiment, read-out logic 12 is configured to perform the readout at least partially in a non-consecutive manner, i.e. to at least partially not read out the groups of sensor elements in their consecutive order. Taking rows as groups of sensor elements as an example, the consecutive order in the example of image sensor 10 of the embodiment of FIG. 1 would for example be to first read out the topmost row of sensor elements, then the second topmost row of sensor elements, then the third topmost row etc. until arriving at the bottommost row of sensor elements or vice versa. Non-consecutive order in this example means that at least in some parts of the readout this order is not kept, for example by reading out a row closer to the bottom before a row closer to the top of image sensor 10.

In the following, this concept of non-consecutive readout will be further illustrated with reference to FIGS. 2-5.

Figure 2A:
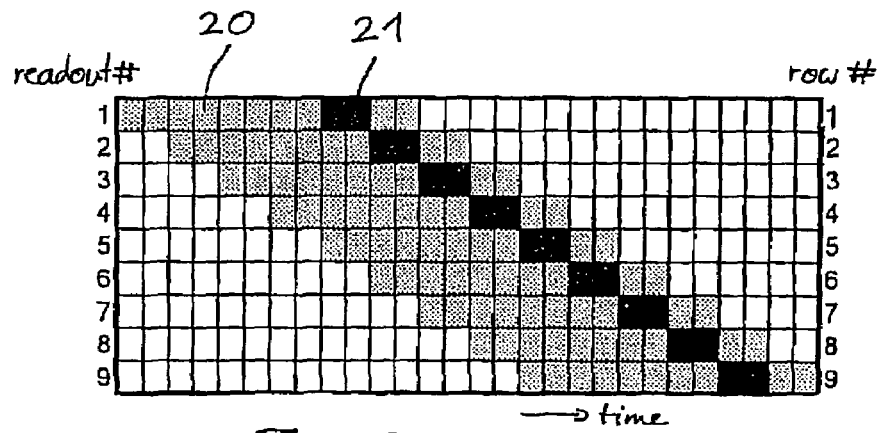
FIG. 2A shows a comparative example of read-out timing.
Figure 2B:
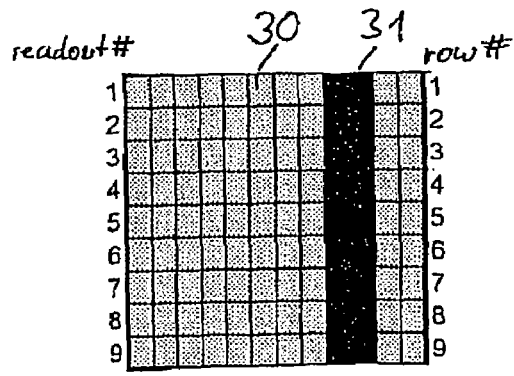
FIG. 2B shows an example of an image obtained with the read-out timing of FIG. 2A.
Figure 3A:
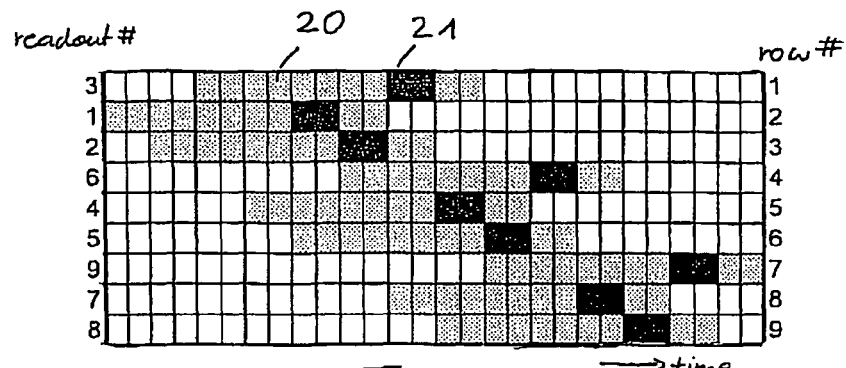
FIG. 3A shows an example of read-out timing according to an embodiment of the present invention.
Figure 3B:
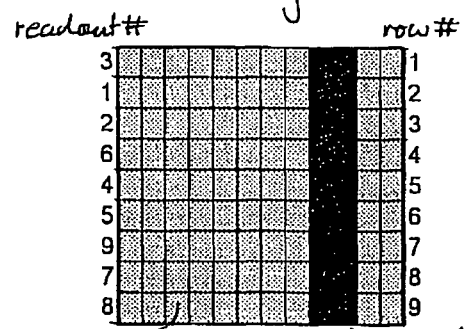
FIG. 3B shows an example of an image obtained with the read-out timing of FIG. 3A.

As an example for a "scenery" to be recorded as an image a vertical line with a neutral background as shown in the images of FIG. 2B or 3B will be used. As a matter of course, it is to be understood that the present invention is not limited to such kind of images, but any desired scenery may be recorded as an image, and the simple scenery of a straight vertical line is used to simplify the explanation only.

In the examples of FIGS. 2-5, an image sensor as shown in FIG. 1 with nine rows of twelve sensor elements each is taken as-an example, although as explained above the present invention is not limited in this respect. As groups of sensor elements as described above, the individual rows are used as example.

In FIGS. 2A and 2B, a comparative example is shown where the groups, i.e. the rows in this case, are read out in a consecutive manner for a case where the object to be recorded is stationary, i.e. in this case the vertical line, does not move with respect to the image sensor. FIG. 2A schematically shows the read-out timing, and FIG. 2B shows the image reconstructed from the data read out. In FIG. 2A, on the right side of the diagram the number of the respective row is noted, where 1 designates the topmost row of sensor elements and 9 designates the bottommost row, and on the left side the read-out order is noted. In the comparative example of FIG. 2A, the read-out order corresponds to the consecutive order of the row, i.e. row number 1 is read out first, then row number 2 is read out etc. until as a ninth row row number 9 is read out. The horizontal axis of the diagram of FIG. 2A corresponds to a schematic time axis.

In FIG. 2A, denoted with reference numeral 20 and shown in grey are sensor elements capturing the background, and shown in black and denoted with reference numeral 21 are sensor elements capturing the object, i.e. the vertical line. Shown in white are times when a row is not read out. As can be seen from FIG. 2A, the start of the readout for the individual rows is performed in a consecutive and sequential order with a time delay between two read-out starts. In particular, first the first row is read out, then with a time delay the second row is read out, then with a further time delay corresponding to the first time delay the third row is read out etc. Since in the example of FIG. 2A the object, i.e. the vertical line, is not moving, the position of sensor elements 21 capturing the vertical line is the same within each row.

In FIG. 2B, an image thus obtained is schematically shown. The image comprises nine rows of twelve image elements each, and image elements corresponding to the background are shown in grey and bear reference numeral 30, while image elements corresponding to the vertical line are shown in black and bear reference numeral 31. As can be seen from FIG. 2B, in this case the object which is a vertical line is correctly represented in the recorded image, i.e. the recorded image shows a vertical line.

Turning now to FIGS. 3A and 3B, an example for a readout of an image sensor, for example a readout of image sensor 10 performed by read-out logic 12 of the embodiment of FIG. 1, according to an embodiment of the invention is shown. The representation of the diagram of FIG. 3A basically corresponds to that of the diagram of FIG. 2A. In the example of FIG. 3A, the readout of the rows of the image sensor is performed at least partially in a non-consecutive manner, i.e. the rows are at least partially not read out according to their consecutive order. As indicated in FIG. 3A, the second row (row #2) is read out first (readout #1), then the third row (row #3) is read out (readout #2), then the first row (row #1) is read out (readout #3) etc. As in FIG. 2A, in black sensor elements recording the image of the vertical line are shown and designated with reference numeral 21, and in grey designated with reference numeral 20 sensor elements recording the background are shown. The corresponding image resulting from the readout schematically shown in FIG. 3A is shown in FIG. 3B, the representation in FIG. 3B corresponding to the representation of FIG. 2B. Shown in black and designated with reference numeral 31 are image elements showing the recorded object, i.e. the vertical line, and shown in grey and bearing reference numeral 30 image elements showing the background are shown. As can be seen, in this case of a non-moving object, the image obtained with this example of a readout according to an embodiment of the present invention as shown in FIG. 3B corresponds to the image as shown in FIG. 2B obtained with a consecutive readout, i.e. a read-out order corresponding to the order of the rows.

Next, the situation when the object to be recorded is moving will be discussed. As an example for an object to be recorded, again a vertical line will be used which is assumed to move to the left with respect to the sensor (for example, if the image sensor is incorporated in a camera and a human being would use to make a photo of the vertical line, the vertical moves to the left as the human being views it).

Figure 4A:
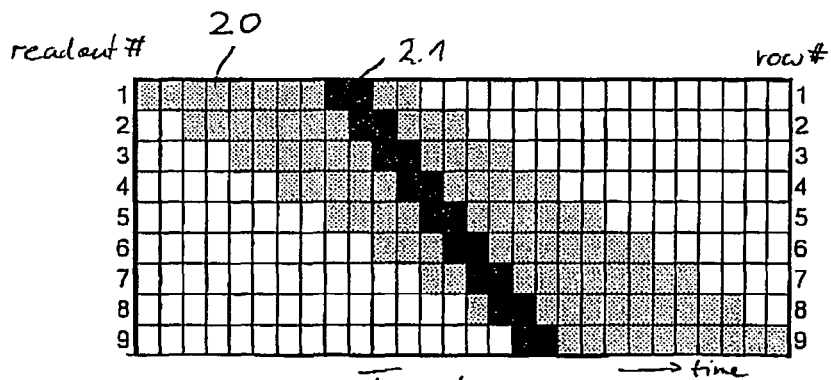
FIG. 4A shows a comparative example of a read-out timing.
Figure 4B:
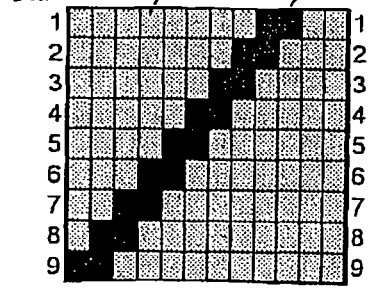
FIG. 4B shows an example of an image obtained with the read-out timing of FIG. 4A.

In FIGS. 4A and 4B, a comparative example is shown where the readout performed corresponds to the readout as explained with reference to FIG. 2A, i.e. the rows are read out in their consecutive order. The representation in FIG. 4A corresponds to the representation of FIG. 2A, i.e. the sensor elements recording the vertical line are designated with reference numeral 21 and shown in black, while the sensor elements recording the background bear reference numeral 20 and are represented in grey. As can be seen in FIG. 4A, since the object, i.e. the vertical line, moves to the left during the readout, in rows which are read out at a later point in time the sensor elements recording the object are positioned more to the left within the respective row than in the rows read out earlier. In the resulting image shown in FIG. 4B where the image elements showing the recorded object are represented in black and bear reference numeral 31, whereas the image elements representing the background are shown in grey and are designated with reference numeral 30, the vertical line is shown as a tilted line tilted to the right which is caused by the movement. It should be noted that an image recorded where a stationary line tilted to the right would be the object to be recorded depending on the level of inclination would look more or less the same as the image shown in FIG. 4B, such that with the consecutive readout an inclined line may be difficult to distinguish from a moving vertical line.

Figure 5A:
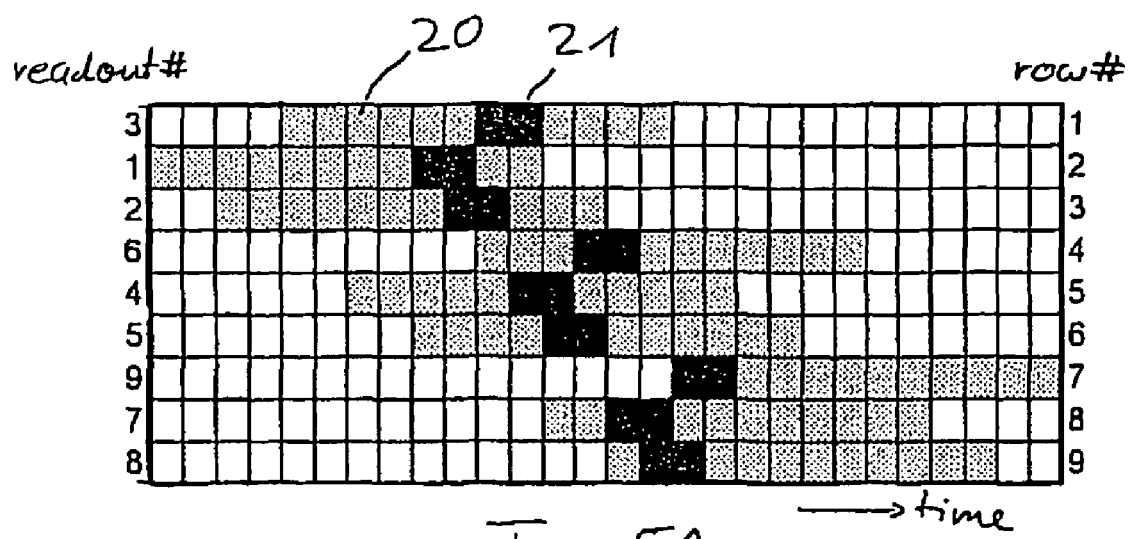
FIG. 5A shows an example of a read-out timing according to an embodiment of the present invention.
Figure 5B:
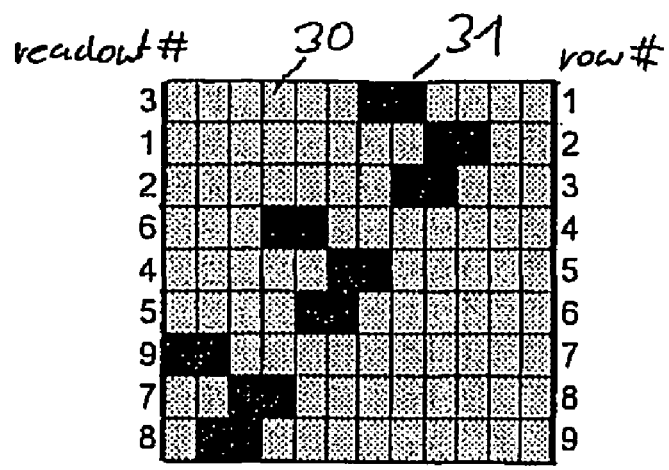
FIG. 5B shows an example of an image obtained with the read-out timing of FIG. 5A.

In FIGS. 5A and 5B, an example for recording an image of a vertical line moving to the left according to an embodiment of the present invention is shown. The representation in FIGS. 5A and 5B again corresponds to the representation of FIGS. 2A and 2B, respectively. In FIG. 5A, the read-out order of the rows is the same as already discussed with reference to FIG. 3A, i.e. an at least partially non-consecutive read-out order of the rows where at least not all the rows are read out in their order from top to bottom. With reference numeral 21 and represented in black again sensor elements are designated which record the image of the moving vertical line, and in grey and designated with reference numeral 20 sensor elements are shown recording the background.

The resulting image is shown in FIG. 5B. Represented in black and designated with reference numeral 31 are image elements corresponding to the recorded object, i.e. the moving vertical line, and represented in grey and designated with reference numeral 30 are image elements corresponding to the background. It can be seen that unlike the situation of FIG. 4B, the line is not recorded as a continuous inclined line, but as a generally inclined pattern or an inclined line with "ripples", i.e. a line where some image elements deviate from the line shape. On the other hand, with the read-out order of the example of FIGS. 5A and 5B, a stationary inclined line would lead to a continuous inclined line being represented in the recorded image. Therefore, in the embodiment discussed with reference to FIGS. 5A and 5B, a moving vertical line leads to a different image than an inclined stationary line and the two cases can therefore be distinguished.

In the example of FIGS. 3 and 5, the readout has been performed in a non-consecutive manner in a way that the rows are grouped in three sets of three rows each (first set with rows #1, #2 and #3, second set with rows #4, #5 and #6 and third set with rows #7, #8 and #9), wherein the sets are read out consecutively (first the first set, then the second set and then the third set), while the readout within the sets is performed in a non-consecutive manner (in the example given, first the second row of each set, then the third row of each set and then the first row of each set). In general, in some embodiments of the present invention the groups of sensor elements, for example rows, columns, groups of adjacent rows or groups of adjacent columns, may be further grouped into sets of such groups, wherein the readout of the groups within each set is performed at least partially in a non-consecutive manner and the readout of the sets is performed in a consecutive manner. For example, in a different embodiment more than three rows may be grouped into each set, and the read-out order within each set may be different from the read-out order discussed with reference to FIGS. 3A and 5A. In still other embodiments, no such sets are used, and the non-consecutive read-out order uses all groups of sensor elements without regard to any grouping into sets.

Returning now to FIG. 1, the image data read out by read-out logic 12 in an at least partially non-consecutive manner from image sensor 10 is fed to a image processor 13. In an embodiment, image processor 13 analyzes the image to detect structures indicating a moving object, for example a "rippled", smeared and/or discontinuous line as represented as an example in FIG. 5B. To detect such structures, a conventional edge detection algorithm may be used. For example, many conventional digital signal processors often comprise edge detecting algorithms which are capable of identifying also "rippled" edges like the one shown in FIG. 5B as an edge. The amount of ripple then for example may be quantified in an embodiment, for example by calculating a standard deviation of the image elements representing the object from a perfect edge, i.e. non-rippled edge. In an embodiment, a standard deviation (or other suitable parameter like mean square error) exceeding a predetermined value is then to be taken as indicative of a moving object.

In an embodiment, when an object has been identified as moving, for example in the above-mentioned way, image processor 13 then corrects the image to represent the actual object correctly or to at least reduce the misrepresentation caused by the movement. In an embodiment, this correction is done based on the read-out order, the read-out speed of the image sensor which is a parameter known and the position of the image elements deviating from the identified edge. In other words, the image elements corresponding to the object are moved to compensate for the above-explained rolling-shutter effect in an embodiment of the present invention. In an embodiment, the background of the object then may be interpolated from surrounding image elements to fill the gaps caused by moving image elements. In another embodiment, a morphing algorithm may be used by image processor 13 to at least reduce the effects of moving objects.

It should be noted that the above-described embodiments are to be taken as examples only and are not to be construed as limiting. For example, while above it has been described that the movement may be corrected, in another embodiment for example a movement warning may be displayed to a user. The read-out order of the rows explained with reference to FIGS. 3 and 5 is also to be taken only as an example, and other readout orders are possible. Furthermore, while in the embodiments described above the readout of rows of sensor elements is performed at least partially in a non-consecutive manner, in other embodiments other groups of image elements may be read out in a non-consecutive manner, wherein such groups may for example be formed by two or more adjacent rows, individual columns, two or more adjacent columns and/or parts of rows or columns, wherein it should be understood that not all groups need to have the same shape.

Other variants, modifications and alternatives will be also apparent to a person skilled in the art upon reading the present application and are intended to be within the scope of the present invention, which is construed to be limited only by the appended claims and equivalents thereof.

What is claimed is:

1. An apparatus, comprising:
   an image sensor, said image sensor comprising an array of light-sensitive sensor elements, wherein the light-sensitive sensor elements are grouped into a plurality of consecutive groups; and
   a read-out circuit configured to read out the light-sensitive sensor elements groupwise,
   wherein the read-out circuit is further configured to perform the groupwise reading out of the groups in a read-out order that is non-consecutive and thus deviates from the consecutive order of the groups, and
   the plurality of groups are further grouped into a plurality of consecutive sets of groups, wherein the read-out circuit is configured to read out the sets of groups according to their consecutive order and configured to read out the groups within each set in the non-consecutive order that deviates from their consecutive order such that all of the groups are read out.

2. The apparatus of claim 1, wherein the read-out circuit is configured to read out the light-sensitive sensor elements such that between the start of readout of at least two consecutive groups of said plurality of groups the readout of at least one further group of said plurality of groups is initiated.

3. The apparatus of claim 1, wherein said light-sensitive sensor elements are arranged in matrix form, said matrix comprising a plurality of rows and a plurality of columns, wherein each of said groups is formed by one element selected from a row, a column, at least two consecutive rows and at least two consecutive columns.

4. The apparatus according to claim 1, wherein said read-out circuit is at least partially integrated in said image sensor.

5. The apparatus of claim 1, wherein said image sensor is selected from the group comprising a CMOS sensor and a CCD sensor.

6. The apparatus of claim 1, wherein said apparatus is an apparatus selected from the group comprising a cellular phone, a digital camera, a laptop and a personal digital assistant.

7. An apparatus, comprising:
   an image sensor, said image sensor being a CMOS sensor and comprising an array of light-sensitive sensor elements, wherein the light-sensitive sensor elements are grouped into a plurality of consecutive groups;
   a read-out circuit configured to read out the light-sensitive sensor elements groupwise, wherein the read-out circuit is further configured to perform the groupwise reading out of the groups in a read-out order that is non-consecutive and thus deviates from the consecutive order of the groups; and
   an image processor coupled to said read-out circuit to receive signals from said read-out circuit describing a single image recorded by said image sensor, wherein said image processor is configured to detect patterns caused by said read-out order, the patterns being used to detect a moving object.

8. The apparatus of claim 7, wherein said pattern detection comprises an edge detection.

9. The apparatus of claim 7, wherein said image processor is further configured to correct the effects in said image caused by said moving of said object.

10. The apparatus of claim 9, wherein said correction is performed depending on at least one parameter selected from the group chosen from said read-out order of said groups, a read-out time of said groups, a deviation of image elements from an edge detected in said image and a time delay between readout of two of said groups.

11. The apparatus of claim 7, wherein the plurality of groups are further grouped into a plurality of consecutive sets of groups, wherein the read-out circuit is configured to read out the sets of groups according to their consecutive order and configured to read out the groups within each set in the non-consecutive order that deviates from their consecutive order.

12. The apparatus of claim 7, wherein the read-out circuit is configured to read out the light-sensitive sensor elements such that between the start of readout of at least two consecutive groups of said plurality of groups the readout of at least one further group of said plurality of groups is initiated.

13. The apparatus of claim 7, wherein said light-sensitive sensor elements are arranged in matrix form, said matrix comprising a plurality of rows and a plurality of columns, wherein each of said groups is formed by one element selected from a row, a column, at least two consecutive rows and at least two consecutive columns.

14. The apparatus according to claim 7, wherein said read-out circuit is at least partially integrated in said image sensor.

15. A method of reading out image data from an image sensor, said image sensor comprising an array of light-sensitive sensor elements, wherein the light-sensitive sensor elements are grouped into a plurality of consecutive sensor element groups, said method comprising:
   reading out said light-sensitive sensor elements groupwise, wherein the groupwise reading out is performed according to a read-out order that is non-consecutive and thus deviates from the consecutive order of said groups, and
   receiving signals describing a single image recorded by said image sensor, so as to detect patterns caused by said read-out order, the patterns being used to detect a moving object.

16. The method of claim 15, wherein the reading out is performed such that between the start of readout of at least two consecutive groups of said plurality of groups the readout of at least one further group of said plurality of groups is initiated.

17. The method of claim 15, wherein the plurality of groups are further grouped into a plurality of consecutive sets of groups, wherein the reading out is configured to read out the sets of groups according to their consecutive order and configured to read out the groups within each set in the non-consecutive order that deviates from their consecutive order.

18. The method of claim 15, wherein said light-sensitive sensor elements are arranged in matrix form, said matrix comprising a plurality of rows and a plurality of columns, wherein each of said groups is formed by one element selected from a row, a column, at least two consecutive rows and at least two consecutive columns.

19. The method of claim 15, further comprising:
   detecting patterns in image data read out from said image sensor, said patterns being caused by said read-out order and being indicative of a moving object being recorded in said image.

* * * * *